United States Patent
Weber

(10) Patent No.: US 6,434,524 B1
(45) Date of Patent: Aug. 13, 2002

(54) OBJECT INTERACTIVE USER INTERFACE USING SPEECH RECOGNITION AND NATURAL LANGUAGE PROCESSING

(75) Inventor: Dean Weber, San Diego, CA (US)

(73) Assignee: One Voice Technologies, Inc., San Diego, CA (US)

( * ) Notice: Subject to any disclaimer, the term of this patent is extended or adjusted under 35 U.S.C. 154(b) by 0 days.

(21) Appl. No.: 09/412,929

(22) Filed: Oct. 5, 1999

Related U.S. Application Data

(63) Continuation-in-part of application No. 09/166,199, filed on Oct. 5, 1998, which is a continuation-in-part of application No. 09/150,459, filed on Sep. 9, 1998.

(51) Int. Cl.[7] .............................................. G01L 15/18
(52) U.S. Cl. ..................... 704/257; 704/275; 704/10; 704/9; 707/3
(58) Field of Search ........................... 704/9, 10, 251, 704/252, 253, 257, 235, 270, 275; 707/4, 3

(56) References Cited

U.S. PATENT DOCUMENTS

| | | | |
|---|---|---|---|
| 4,783,803 A | | 11/1988 | Baker et al. ............... 381/42 |
| 4,887,212 A | | 12/1989 | Zamora et al. ............ 364/419 |
| 5,311,429 A | * | 5/1994 | Tominaga |
| 5,799,279 A | * | 8/1998 | Gould et al. ............... 704/231 |
| 5,991,721 A | * | 11/1999 | Asano et al. .............. 704/239 |
| 6,112,174 A | * | 8/2000 | Wakisaka et al. .......... 701/117 |
| 6,144,938 A | * | 11/2000 | Surace et al. ............. 704/257 |
| 6,188,977 B1 | * | 2/2001 | Hirota ....................... 704/9 |

FOREIGN PATENT DOCUMENTS

| | | | | |
|---|---|---|---|---|
| EP | 0 837 962 A2 | * | 4/1998 | ............ G01L/5/06 |

OTHER PUBLICATIONS

Wyard et al., Spoken Language systems–beyond prompt and response, Jan. 1996, BT Technology Journal, vol. 14, No. 1, pp. 187–207.*

Approximate Word–Spotting Method for Constrained Grammars; Oct. 1994; IBM Technical DisclosureBulletin, vol. 37, No. 10, pp. 385.*

* cited by examiner

*Primary Examiner*—William Korzuch
*Assistant Examiner*—Abul K. Azad
(74) *Attorney, Agent, or Firm*—James Y. C. Sze; Pillsbury Winthrop LLP

(57) ABSTRACT

A system and method for interacting with objects, via a computer using utterances, speech processing and natural language processing. A Data Definition File relates networked objects and a speech processor. The Data Definition File encompasses a memory structure relating the objects, including grammar files, a context-specific dictation model, and a natural language processor. The speech processor searches a first grammar file for a matching phrase for the utterance, and for searching a second grammar file for the matching phrase if the matching phrase is not found in the first grammar file. The system also includes a natural language processor for searching a database for a matching entry for the matching phrase; and an application interface for performing an action associated with the matching entry if the matching entry is found in the database. The system utilizes context-specific grammars and dictation models, thereby enhancing speech recognition and natural language processing efficiency. Additionally, for each user the system adaptively and interactively "learns" words and phrases, and their associated meanings, storing the adaptive updates into user voice profiles. Because the user voice profiles can be stored locally or remotely, users can access the adaptively learned words and phrases at various locations.

76 Claims, 12 Drawing Sheets

| Phase | Required words | Context/Subcontext | Action 1 | Action 2 |
|---|---|---|---|---|
| What movies are playing at $time | 3 | movies | Access movie web site | N/A |
| What is the price of IBM stock on $date | 4 | stocks | Access stock price web site | N/A |
| Sell IBM stock at $dollars | 4 | stocks | Access stock price web site | N/A |
| What is the weather at $location | 3 | weather | Access weather web site | N/A |
| What time is it | 2 | time | N/A | Text-to-Speech of Time |
| Show me the news | 2 | news | Access news web site | Display Images |
| How do I format this paragraph | 2 | Word Processor | Locate Word Processor Help | Format Paragraph Help |
| How do I insert a table | 2 | Spreadsheet | Locate Spreadsheet Help | Insert Table Help |

FIG. 4

| object | TTS Flag | Text Speech | Use Grammar | Append Grammar | Is Yes/No? | Do Yes | Do No |
|---|---|---|---|---|---|---|---|
| http://www.conversit.com | X | "Hello, welcome to..." | | X | | | |
| http://www.conversit.com/news | X | "Would you like to learn..." | | | X | 210 | 211 |
| http://www.conversit.com/products | X | "All natural language..." | X | | | | |
| http://www.conversit.com/ViaVoice | X | "Via Voice is..." | | | | | |
| http://www.conversit.com/search | X | "To format paragraphs..." | | | X | 254 | 213 |
| WPHelp:Format:Paragraph | | | | | | | |
| ... | | | | | | | |
| SpreadsheetHelp:Insert:Table | X | "Inserting Tables is easy..." | | | | | |

FIG. 6

OBJECT INTERACTIVE USER INTERFACE USING SPEECH RECOGNITION AND NATURAL LANGUAGE PROCESSING

The aspects of the present invention relate to speech recognition for an object-based computer user interfice. More specifically, the embodiments of the present invention relate to a novel method and system for user interaction with a computer using speech recognition and natural language process. This application is a continuation-in-part of U.S. patent application Ser. No. 09/166,198, entitled "Network interactive User Interface Using Speech Recognition and Natural Language Processing," filed Oct. 5, 1998, a continuation-in-part of U.S. patent application Ser. No. 09/150,459, entitled "Interactive User Interface Using Speech Recognition and Natural Language Processing" filed Sep. 9, 1998. This application is additionly related to PCT/US99/20445 and PCT/US99/20447, both filed Sep. 9, 1999, corresponding to U.S. patent application Ser. Nos. 09/150,459 and 09/166,198, respectively.

BACKGROUND

Description of the Related Art

As computers have become more prevalent it has become clear that many people have great difficulty understanding and communicating with computers. A user must often learn archaic commands and non-intuitive procedures in order to operate the computer. For example, most personal computers use windows-based operating systems that are largely menu-driven. This requires that the user learn what menu commands or sequence of commands produce the desired results.

Furthermore, traditional interaction with a computer is often slowed by manual input devices such as keyboards or mice. Many computer users are not fast typists. As a result, much time is spent communicating commands and words to the computer through these manual input devices. It is becoming clear that an easier, faster and more intuitive method of communicating with computers and networked objects, such as web-sites, is needed.

One proposed method of computer interactions is speech recognition. Speech recognition involves software and hardware that act together to audibly detect human speech and translate the detected speech into a string of words. As is known in the art, speech recognition words by breaking down sounds the hardware detects into smaller non-divisible sounds called phonemes. Phonemes are distinct units of sound. For example, the word "those" is made up of three phonemes, the first is the "th" sound, the second is the "o" sound, and the third is the "s" sound. The speech recognition software attempts to match the detected phonemes with known words from a stored dictionary. An example of a speech recognition system is given in U.S. Pat. No. 4,783,803, entitled "SPEECH RECOGNITION APPARATUS AND METHOD", issued Nov. 8, 1998, assigned to Dragon Systems, Incorporated. Presently, there are many commercially available speech recognition software packages available from such companies as Dragon Systems, Inc. and International Business Machine Corporation.

One limitation of these speech recognition software packages or systems is that they typically only perform command and control or dictation functions. Thus, the user is still required to learn a vocabulary of commands in order to operate the computer.

A proposed enhancement to these speech recognition systems is to process the detected words using a natural language processing system. Natural language processing generally involves determining a conceptual "meaning" (e.g., what meaning the speaker intended to convey) of the detected words by analyzing their grammatical relationship and relative context. For example, U.S. Pat. No. 4,887,212, entitled "PARSER FOR NATURAL LANGUAGE TEXT", issued Dec. 12, 1989, assigned to International Business Machines Corporation teaches a method of parsing an input stream of words by using word isolation, morphological analysis, dictionary look-up and grammar analysis.

Natural language processing used in concert with speech recognition provides a powerful tool for operating a computer using spoken words rather than manual input such as a keyboard or mouse. However, one drawback of a conventional natural language processing system is that it may fail to determine the correct "meaning" of the words detected by the speech recognition system. In such a case, the user is typically required to recompose or restate the phrase, with the hope that the natural language processing system will determine the correct "meaning" on subsequent attempts. Clearly, this may lead to substantial delays as the user is required to restate the entire sentence or command. Another drawback of conventional systems is that the processing time required for the speech recognition can be prohibitively long. This is primarily due to the finite speed of the processing resources as compared with the large amount of information to be processed. For example, in many conventional speech recognition programs, the time required to recognize the utterance is long due to the size of the dictionary file being searched.

An additional drawback of conventional speech recognition and natural language processing systems is that they are not interactive, and thus are unable to cope with new situations. When a computer system encounters unknown or new networked objects, new relationships between the computer and the objects are formed. Conventional speech recognition and natural language processing systems are unable to cope with the situations that result from the new relationships posed by previously unknown networked objects. As a result, a conversational-style interaction with the computer is not possible. The user is required to communicate complete concepts to the computer. The user is not able to speak in sentence fragments because the meaning of these sentence fragments (which is dependent on the meaning of previous utterances) will be lost.

Another drawback of conventional speech recognition and natural language processing systems is that once a user successfully "trains" a computer system to recognize the user's speech and voice commands, the user cannot easily move to another computer without having to undergo the process of training the new computer. As a result, changing a user's computer workstations or location results in wasted time by users that need to re-train the new computer to the user's speech habits and voice commands.

SUMMARY

The embodiments of the present invention include a novel and improved system and method for interacting with a computer using utterances, speech processing and natural language processing. Generally, the system comprises a speech processor for searching a first grammar file for a matching phrase for the utterance, and for searching a second grammar file for the matching phrase if the matching phase is not found in the first grammar file. The system also includes a natural language processor for searching a database for a match entry for the matching phrase; and an application interface for performing an action associated with the matching entry if the matching entry is found in the database.

In one embodiment, the natural language processor updates at least one of the database, the first grammar file and the second grammar file with the matching phrase if the matching entry is not found in the database.

The first grammar file is a context-specific grammar file. A context-specific grammar file is one that contains words and phrases that are highly relevant to a specific subject. The second grammar file is a general grammar file. A general grammar file is one that contains words and phrases which do not need to be interpreted in light of a context. That is to say, the words and phrases in the general grammar file do not belong to any parent context. By searching the context-specific grammar file before searching the general grammar file, the present invention allows the user to communicate with the computer using a more conversational style, wherein the words spoken, if found in the context specific grammar file, are interpreted in light of the subject matter most recently discussed.

In a further aspect of the present invention, the speech processor searches a dictation grammar for the matching phrase if the matching phrase is not found in the general grammar file. The dictation grammar is a large vocabulary of general words and phrases. By searching the context-specific and general grammars first, it is expected that the speech recognition time will be greatly reduced due to the context-specific and general grammars being physically smaller files than the dictation grammar.

In another aspect of the present invention, the speech processor searches a context-specific dictation model for the matching phrase if the matching phrase is not found within the dictation grammar. A context-specific dictation model is a model that indicates the relationship between words in a vocabulary. The speech processor uses this to determine help decode the meaning of related words in an utterance.

In another aspect of the present invention, the natural language processor replaces at least one word in the matching phrase prior to searching the database. This may be accomplished by a variable replacer in the natural language processor for substituting a wildcard for the at least one word in the matching phrase. By substituting wildcards for certain words (called "word-variables") in the phrase, the number of entries in the database can be significantly reduced. Additionally, a pronoun substituter in the natural language processor may substitute a proper name for pronouns the matching phrase, allowing user-specific facts to be stored in the database.

In another aspect, a string formatter text formats the matching phrase prior to searching the database. Also, a word weighter weights individual words in the matching phrase according to a relative significance of the individual words prior to searching the database. These acts allow for faster, more accurate searching of the database.

A search engine in the natural language processor generates a confidence value for the matching entry. The natural language processor compares the confidence value with a threshold value. A boolean tester determines whether a required number of words from the matching phrase are present in the matching entry. This boolean testing serves as a verification of the results returned by the search engine.

In order to clear up ambiguities, the natural language processor prompts the user whether the matching entry is a correct interpretation of the utterance if the required number of words from the matching phrase are not present in the matching entry. The natural language processor also prompts the user for additional information if the matching entry is not a correct interpretation of the utterance. At least one of the database, the first grammar file and the second grammar file are updated with the additional information. In this way, the present invention adaptively "learns" the meaning of additional utterances, thereby enhancing the efficiency of the user interface.

The speech processor will enable and search a context-specific grammar associated with the matching entry for a subsequent matching phrase for a subsequent utterance. This ensures that the most relevant words and phrases will be searched first, thereby decreasing speech recognition times.

Generically, the embodiments include a method to update a computer for voice interaction with an object, such as a help file or web page. Initially, an object table, which associates with the object with the voice interaction system, is transferred to the computer over a network. The location of the object table can be imbedded within the object, at a specific internet web-site, or at consolidated location that stores object tables for multiple objects. The object table is searched for an entry marching the object. The entry matching object may result in an action being performed, such as text speech being voiced through a speaker, a context-specific grammar file being used, or a natural language processor database being used. The object table may be part of a dialog definition file. Dialog definition files may also include a context-specific grammar, entries for a natural language processor database, a context-specific dictation model, or any combination thereof.

In another aspect of the present invention, a network interface transfers a dialog definition file from over the network. The dialog definition file contains an object table. A data processor searches the object table for a table entry that matches the object. Once this matching table entry is found, an application interface performs an action specified by the matching entry.

In another aspect of the present invention, the dialog definition file associated with a network is located, and then read. The dialog definition file could be read from a variety of locations, such as a web-site, storage media, or a location that stores dialog definition files for multiple objects. An object table, contained within the dialog definition file, is searched to find a table entry matching the object. The matching entry defines an action associated with the object, and the action is then performed by the system. In addition to an object table, the dialog definition file may contain a context-specific grammar, entries for a natural language processor database, a context-specific dictation model, or any combination thereof.

BRIEF DESCRIPTION OF THE DRAWINGS

The embodiments of the present invention will become more apparent from the detailed description set forth below when taken in conjunction with the drawings in which like reference characters identify correspondingly throughout and wherein:

FIG. 4 is a diagram of selected columns of an exemplary natural language processing (NLP) database embodiment of the present invention;

FIG. 6 is a diagram of selected columns of an exemplary object table;

DETAILED DESCRIPTION

Figure 1:
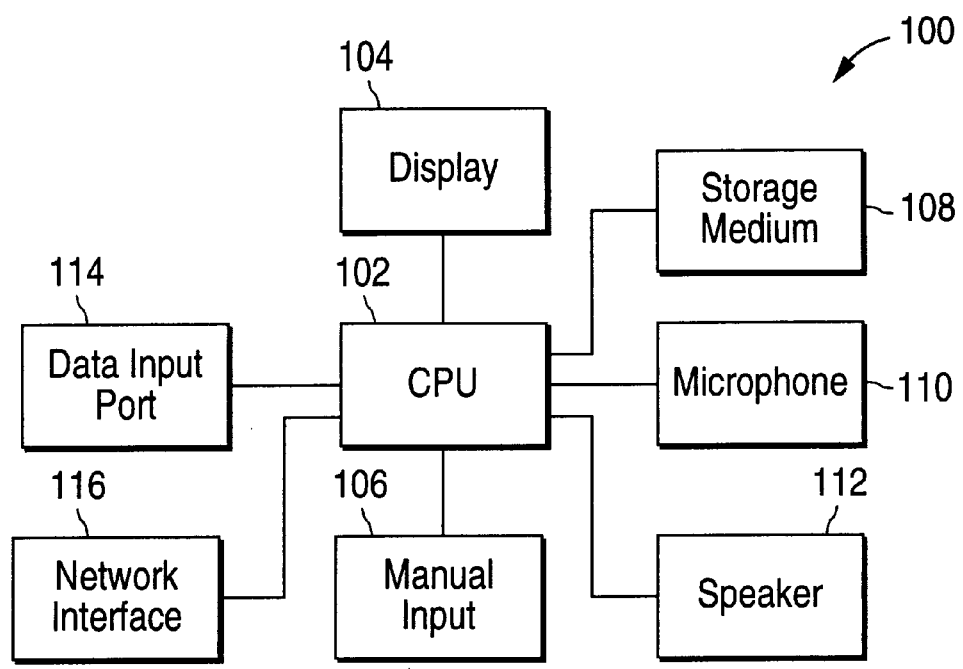
FIG. 1 is a functional block diagram of an exemplary computer system embodiment.

The embodiments of the present invention will now be disclosed with reference to a functional block diagram of an exemplary computer system 100 of FIG. 1, constructed and operative in accordance with an embodiment of the present invention. In FIG. 1, computer system 100 includes a central processing unit (CPU) 102. The CPU 102 may be any general purpose microprocessor or microcontroller as is known in the art, appropriately programmed to perform the method embodiment described herein with reference to FIGS. 3A–3D. For example, CPU 102 may be a conventional microprocessor such as the Pentium II processor manufactured by Intel Corporation or the like.

CPU 102 communicates with a plurality of peripheral equipment, including a display 104, manual input 106, storage medium 108, microphone 110, speaker 112, data input port 114 and network interface 116. Display 104 may be a visual display such as a CRT, LCD screen, touch-sensitive screen, or other monitors as are known in the art for visually displaying images and text to a user. Manual input 106 may be a conventional keyboard, keypad, mouse, trackball, or other input device as is known in the art for the manual input of data. Storage medium 108 may be a conventional read/write memory such as a magnetic disk drive, floppy disk drive, CD-ROM drive, silicon memory or other memory device as is known in the art for storing and retrieving data. Significantly, storage medium 108 may be remotely located from CPU 102, and be connected to CPU 102 via a network such as a local area network (LAN), or a wide area network (WAN), or the Internet. Microphone 110 may be any suitable microphone as is known in the art for providing audio signals to CPU 102. Speaker 112 may be any suitable speaker as is known in the art for reproducing audio signals from CPU 102. It is understood that microphone 110 and speaker 112 may include appropriate digital-to-analog and analog-to-digital conversion circuitry as appropriate. Data input port 114 may be any data port as is known in the art for interfacing with an external accessory using a data protocol such as RS-232, Universal Serial Bus, or the like. Network interface 116 may be any interface as known in the art for communicating or transferring files across a computer network, examples of such networks include TCP/IP, ethernet, or token ring networks. In addition, on some systems, a network interface 116 may consist of a modem connected to the data input port 114.

Thus, FIG. 1 illustrates the functional elements of a computer system 100. Each of the elements of computer system 100 may be suitable off-the-shelf components as described above. The embodiments of the present invention provide a method and system for human interaction with the computer system 100 using speech.

Figure 8:
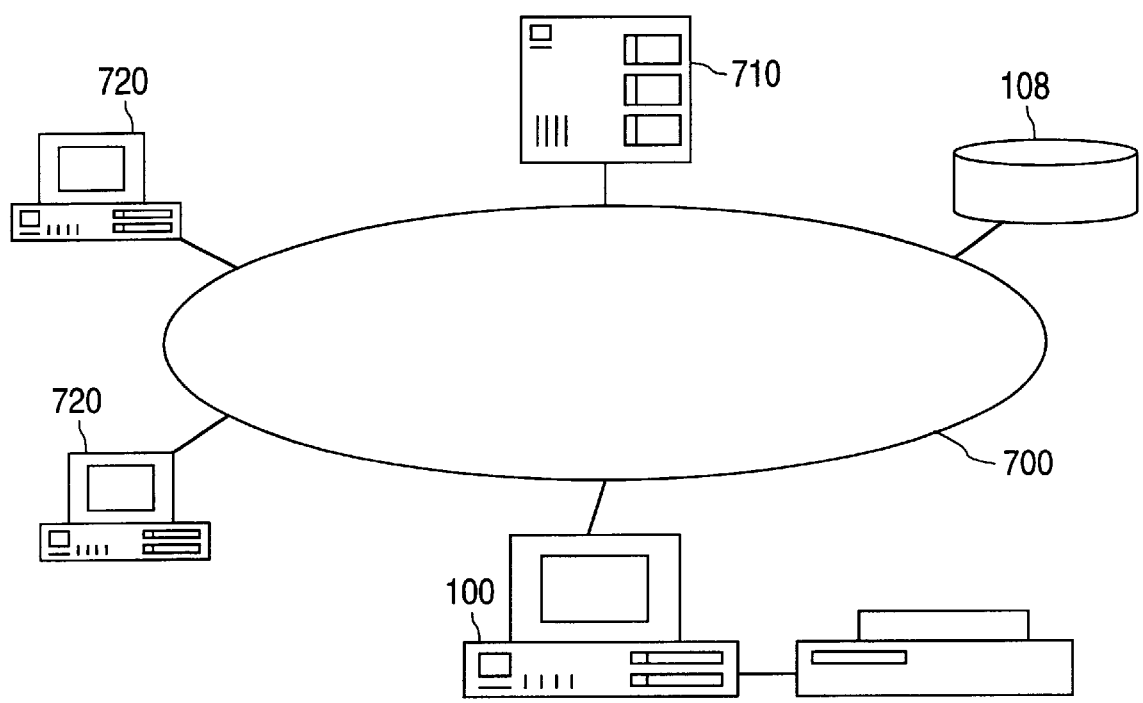
FIG. 8 is a diagram depicting a computer system connecting to other computers, storage media, and web-sites via the Internet.

As shown in FIG. 8, constructed and operative in accordance with an embodiment of the present invention, the computer system 100 may be connected to the Internet 700, a collection of computer networks. To connect to the Internet 700, computer system 100 may use a network interface 116, a modem connected to the data input port 114, or any other method known in the art. Web-sites 710, other computers 720, and storage media 108 may also be connected to the Internet through such methods known in the art.

Figure 2:
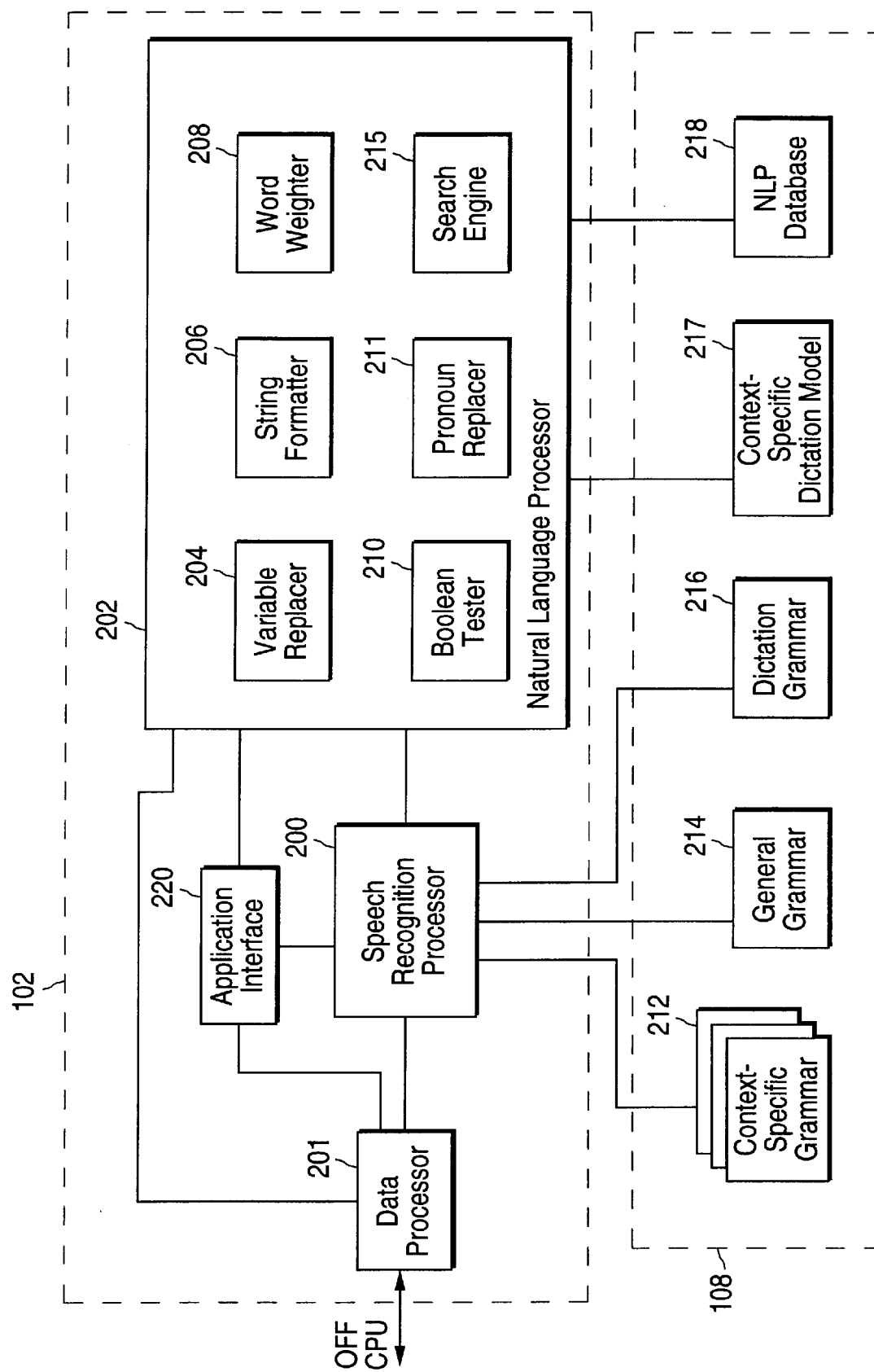
FIG. 2 is an expanded functional block diagram of the CPU 102 and storage medium 108 of the computer system embodiment of FIG. 1.

Turning now to FIG. 2, FIG. 2 illustrates an expanded functional block diagram of CPU 102 and storage medium 108 constructed and operative in accordance with an embodiment of the present invention. CPU 102 includes speech recognition processor 220, natural language processor 202 and application interface 220. Natural language processor 202 further includes variable replace 204, string formatter 206, wore weighter 208, boolean tester 210, pronoun replacer 211, and search engine 213. Storage medium 108 includes a plurality of context-specific grammar files 212, general grammar file 214, dictation grammar 216, and natural language processor (NLP) database 218. In one embodiment, the grammar files 212, 214, and 216 are Bakus-Naur Form (BNF) files, which describe the structure of the language spoken by the user. BNF files are well-known in the art for describing the structure of language, and details of BNF files will therefore not be discussed herein. One advantage of BNF files is that hierarchical tree-like structures may be used to describe phrases or word sequences, without the need to explicitly recite all combinations of these word sequences. Thus, the use of BNF files in the embodiment minimizes the physical sizes of the files 212, 214, and 216 in the storage medium 108, increasing the speed at which these files can be enabled and searched as described below. However, in alternate embodiments, other file structures are used.

The context-specific dictation model 217 is an optional file that contains specific models to improve dictation accuracy. These models enable users to specify word orders and word models. The models accomplish this by describing words and their relationship to other words, thus determining word meaning by contextual interpretation in a specific field or topic. Take for example, the phrase "650 megahertz microprocessor computer." A context-specific dictation model 217 for computers may indicate the likelihood of the word "microprocessor" with "computer," and that a number, such as "650" is likely to be found near the word "megahertz." By interpreting the context of the words, via a context-specific dictation model 217, a speech recognition processor would analyze the phrase, interpret a single object, i.e. the computer, and realize that "650 megahertz microprocessor" are adjectives or traits describing the type of computer.

Topics for context-specific dictation models 217 vary widely, and may include any topic area of interest to a user-both broad and narrow. Broad topics may include: history, law, medicine, science, technology, or computers. Specialized topics, such as a particular field of literature encountered at a book retailer's web-site are also possible. Such a context-specific dictation model 217 may contain text for author and title information, for example.

Finally, the context-specific dictation model 217 format relies upon the underlying speech recognition processor 200, and is specific to each type of speech recognition processor 200.

Figure 3A:
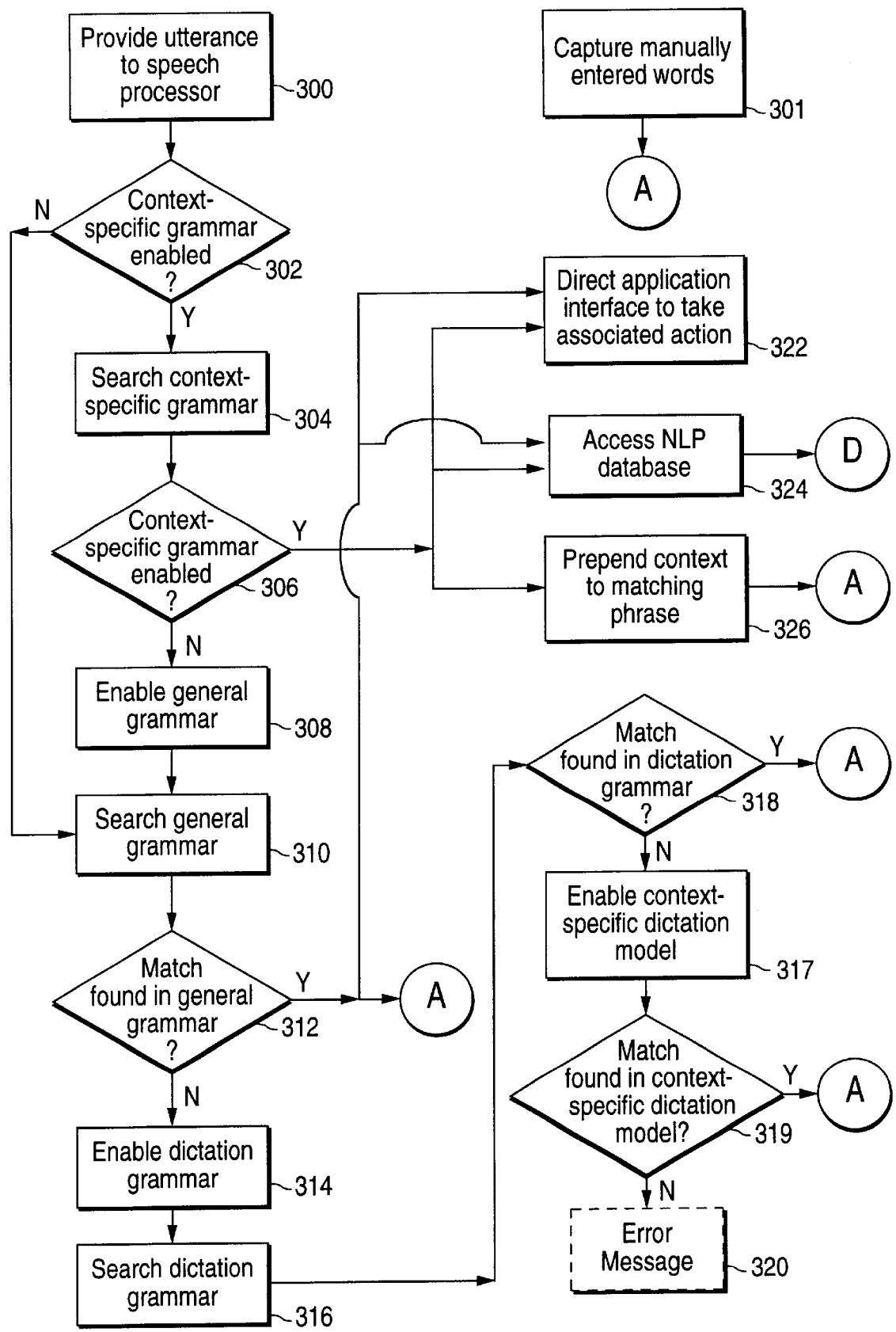
FIGS. 3A–3D are a flowchart of a method embodiment of providing interactive speech recognition and natural language processing to a computer.

The operation and interaction of these functional elements of FIG. 2 will be described with reference to the flowchart of FIGS. 3A–3D, constructed and operative in accordance with an embodiment of the present invention. In FIG. 3A, the flow begins at block 300 with the providing of an utterance to speech processor 200. An utterance is a series of sounds having a beginning and an end, and may include one or more spoken words. Microphone 110 which captures spoken words may perform the act of block 300. Alternately, the utterance may be provided to the speech processor 200 over data input port 114, or from storage medium 108. In one embodiment, the utterance is in a digital format such as the well-known "wav" audio file format.

The flow proceeds to decision 302 where the speech processor 200 determines whether one of the context-specific grammars 212 has been enabled. If the context-specific grammars 212 are enabled, the context-specific grammars 212 are searched at block 304. In the preferred embodiment, the context-specific grammars 212 are BNF files that contain words and phrases which are related to a parent context. In general, a context is a subject area. For example, in one embodiment of the present invention applicable to personal computers, examples of contexts may be "news", or "weather", or "stocks". In such a case, the context-specific grammars 212 would each contain commands, control words, descriptors, qualifiers, or parameters that correspond to a different one of these contexts. The use of contexts provides a hierarchical structure for types of information. Contexts and their use will be described further below with reference to the NLP database 218.

If a context-specific grammar 212 has been enabled, the context-specific grammar 212 is searched for a match to the utterance provided at block 300. However, if a context-specific grammar 212 has not been enabled, the flow proceeds to block 308 where the general grammar 214 is enabled.

In one embodiment, the general grammar 214 is a BNF file which contains words and phrases which do not, themselves, belong to a parent context, but may have an associated context for which a context-specific grammar file 212 exists. In other words, the words and phrases in the general grammar 214 may be at the root of the hierarchical context structure. For example, in one embodiment applicable to personal computers, the general grammar 214 would contain commands and control phrases.

In block 310, the general grammar 214 is searched for a matching word or phrase for the utterance provided at block 300. If a match is not found, then the dictation grammar 216 is enabled. In one embodiment, the dictation grammar 216 is a BNF file that contains a list of words that do not, themselves, have either a parent context or an associated context. For example, in one embodiment applicable to a personal computer, the dictation grammar 216 contains a relatively large list of general words similar to a general dictionary.

In block 316 the dictation grammar is searched for matching words for each word of the utterance provided at block 300. At decision block 318, if no matching words are found, any relevant context-specific dictation model 217 is enabled at block 317.

At decision block 319, if no matching words are found, a visual error message is optionally displayed at the display 104 or an audible error message is optionally reproduced through speaker 112, at block 320. The process ends until another utterance is provided to the speech processor 200 at block 300.

Thus, as can be seen from the above description, when an utterance is provided to the speech processor 200, the enabled context-specific grammar 212, if any, is first searched. If there are no matches in the enabled context-specific grammar 212, then the general grammar 214 is enabled and searched. If there are no matches in the general grammar 214, then the dictation grammar 316 is enabled and searched. Finally, if there are not matches in the dictation grammar 316, a context-specific dictation model 217 is enabled 317 and used to interpret the utterance.

In one embodiment, when the speech recognition processor 200 is searching either the context-specific grammar 212 or the general grammar 214, it is said to be in the "command and control" mode. In this mode, the speech recognition processor 200 compares the entire utterance as a whole to the entries in the grammar. By contrast, when the speech recognition processor 200 is searching the dictation grammar, it is said to be in the "dictation" mode. In this mode, the speech recognition processor 200 compares the utterance to the entries in the dictation grammar 216 one word at a time. Finally, when the speech recognition processor 200 is matching the utterance either a context-specific dictation model 217, it is said to be in "model matching" mode. It is expected that searching for a match for an entire utterance in the command and control mode will generally be faster than searching for one word at a time in dictation or model matching modes.

It is further expected that any individual context-specific grammar 212 will be smaller in size (i.e., fewer total words and phrases) than the general grammar 214, which in turn will be smaller in size than the dictation grammar 216. Thus, by searching any enabled context-specific grammar 212 first, it is likely that a match, if any, will be found more quickly, due at least in part to the smaller file size. Likewise, by searching the general grammar 214 before the dictation grammar 216, it is likely that a match, if any, will be found more quickly.

Additionally, as will be explained further below with regard to the ability of the embodiments to adaptively add to both the context-specific grammar 212 and the general grammar 214, they will contain the most common utterances. As such, it is expected that a match is more likely to be found quickly in the context-specific grammar 212 or the general grammar 214 than in the dictation grammar 216.

Finally, as will be explained further below, the words and phrases in the enabled context-specific grammar 212 are more likely to be uttered by the user because they are words that are highly relevant to the subject matter about which the user was most recently speaking.

This also allows the user to speak in a more conversational style, using sentence fragments, with the meaning of his words being interpreted according to the enabled context-specific grammar 212.

By searching in the above-described sequence, the embodiments of the present invention may search more efficiently than if the searching were to occur one entry at a time in a single, large list of all expected words and phrases.

Referring back to decision 306, if a match is found in the context-specific grammar 212, then there are three possible next steps shown in FIG. 3A. For each matching entry in the enabled context-specific grammar 212, there may be an associated action to be taken by the speech recognition processor 200. Block 322 shows that one action may be to direct application interface 220 to take some action with respect to a separate software application or entity. For example, application interface 220 may use the Speech Application Programming Interface (SAPI) standard by Microsoft to communicate with an external application. The external application may be directed, for example, to access a particular Internet web site URL or to speak a particular phrase by converting text to speech. Other actions may be taken as will be discussed further below with reference to the NLP database 218 of FIG. 4.

Block 324 shows that another action may be to access a row in the natural language processing (NLP) database 218 directly, thereby bypassing the natural language processing acts described further below. Block 326 shows that another action may to prepend a word or phrase for the enabled context to the matching word or phrase found in the context-specific grammar 306, For example, if the enabled context were "movies" and the matching utterance were "8 o'clock", the word "movies" would be prepended to the phrase "8 o'clock" to form the phrase "movies at 8 o'clock".

Likewise, if a match is found in the general grammar 214, then the flow may proceed to block 322 where the application interface 220 is directed to take an action as described above, or to block 324 where a row in the NLP database is directly accessed. However, if a match is found in the general grammar 214, no prepending of a context occurs because, as stated above, the entries in the general grammar 214 do not, themselves, have a parent context.

Alternatively, manually entered words may be captured, at block 301, and input into the natural language processor.

Finally, with reference to FIG. 3A, words may be entered manually via manual input 106. In this case, no speech recognition is required, and yet natural language processing of the entered words is still desired. Thus, the flow proceeds to FIG. 3B.

Figure 3B:
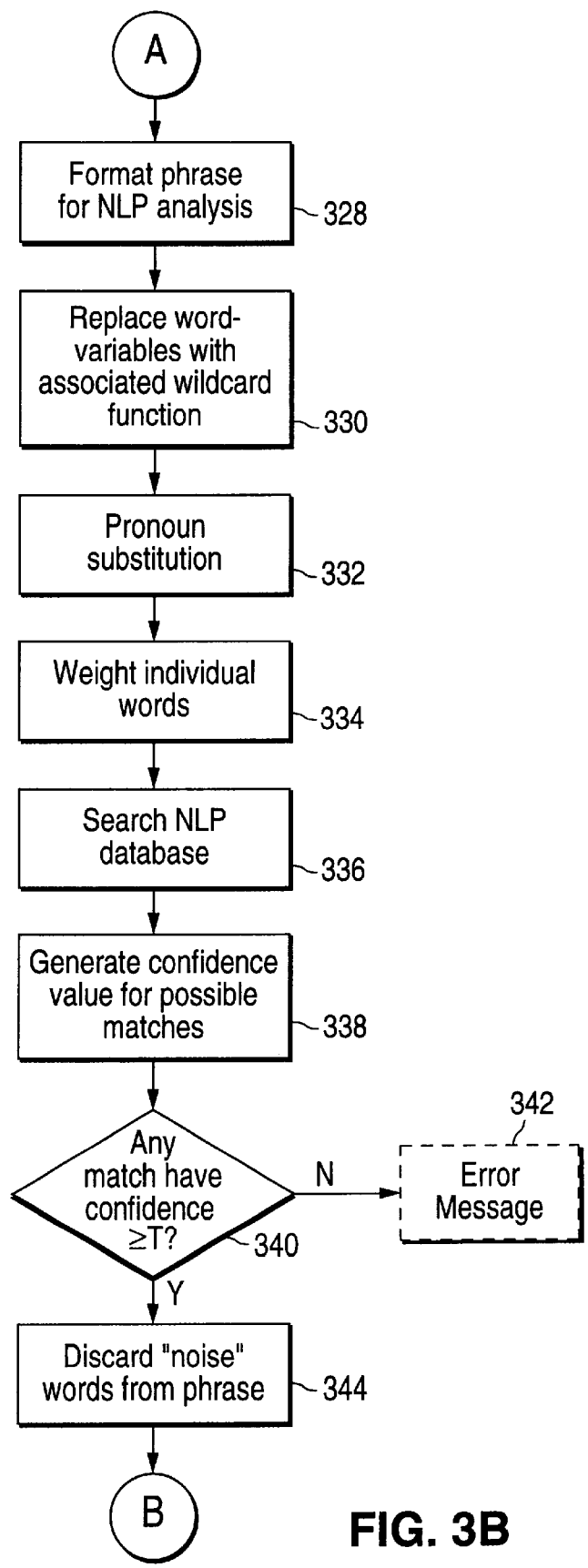

In FIG. 3B, at block 328, the natural language processor 202 formats the phrase for natural language processing analysis. This formatting may be accomplished by string formatter 206 and may include such text processing as removing duplicate spaces between words, making all letters lower case (or upper case), expanding contractions (e.g., changing "it's" to "it is"), and the like. The formatting prepares the phrase for parsing.

The flow continues to block 330 where certain "word-variables" are replaced with an associated wildcard function by variable replacer 204 in preparation for accessing the NLP database 218. As used herein, the term "word-variables" refers to words or phrases that represent amounts, dates, times, currencies, and the like. For example, in one embodiment the phrase "what movies are playing at 8 o'clock" would be transformed at block 330 to "what movies are playing at $time" where "$time" is a wildcard function used to represent any time value. As another example, in one embodiment the phrase "sell IBM stock at 100 dollars" would be transformed at block 330 to "sell IBM stock at $dollars" where "$dollars" is a wildcard function used to represent any dollar value. This act may be accomplished by a simple loop that searches the phrase for key tokens such as the words "dollar" or "o'clock" and replaces the word-variables with a specified wildcard function. In order to keep track of the location in the phrase where the substitution was made, an array memory be used. This allows re-substitution of the original word-variable back ubti the phrase at the some position after the NLP database 218 has been searched.

The replacing of word-variables with an associated wildcard function at block 330 reduces the number of entries that must be present in the NLP database 218. For example, the NLP database 218 would only contain the phrase "what movies are playing at $time" rather than a separate entry for 8 o'clock, 9 o'clock, 10 o'clock, and so on. The NLP database 218 will be described further below.

At block 332, pronouns in the phrase are replaced with proper names by pronoun replacer 211. For example, in one embodiment the pronouns "I", "my" or "mine" would be replaced with the speaker's name. This allows user-specific facts to be stored and accessed in the NLP database 218. For example, the sentence "who are my children" would be transformed into "who are Dean's children" where "Dean" is the speaker's proper name. Again, this act may be performed in a simple loop that searches the phrase for pronouns, and replaces the pronouns found with an appropriate proper name. In order to keep track of the locations in the phrase where a substitution was made, an array may be used.

In block 334, the individual words in the phrase are weighted according to their relative "importance" or "significance" to the overall meaning of the phrase by word weighter 208. For example, in one embodiment there are three weighting factors assigned. The lowest weighting factor is assigned to words such as "a", "an", "the" and other articles. The highest weighting factor is given to words that are likely to have a significant relation to the meaning of the phrase. For example, these may include all verbs, nouns, adjectives, and proper names in the NLP database 218. A medium weighting factor is given to all other words in the phrase. This weighting allows more powerful searching of the NLP database 218.

An example of selected columns of the NLP database 218 of one embodiment is shown in FIG. 4. The NLP database 218 comprises a plurality of columns 400–410, and a plurality of rows 412A–412N. In column 400, the entries represent phrases that are "known" to the NLP database. In column 402, a number of required words for each entry in column 400 is shown. In column 404, an associated context or subcontext for each entry in column 400 is shown. In columns 408 and 410, one or more associated actions are shown for each entry in column 400. It should be noted that the NLP database 218 shown in FIG. 4 is merely a simplified example for the purpose of teaching the present invention. Other embodiments may have more or fewer columns with different entries.

Referring back to FIG. 3B, at block 336, the NLP database 218 is searched for possible matches to the phrase, based on whether the entry in column 400 of the NLP database 218 contains any of the words in the phrase (or their synonyms), and the relative weights of those words. At block 338, a confidence value is generated for each of the possible matching entries based on the number of occurrences of each of the words in the phrase and their relative weights. Weighted word searching of a database is well known in the art and may be performed by commercially available search engines such as the product "dtsearch" by DT Software, Inc. of Arlington, Va. Likewise, searching using synonyms is well known in the art and may be accomplished using such publicly available tools such as "WordNet," developed by the Cognitive Science Laboratory of Princeton University in Princeton, N.J. The search engine may be an integral part of the natural language processor 202.

At decision 340, the natural language processor 202 determines whether any of the possible matching entries has a confidence value greater than or equal to some predetermined minimum threshold, T. The threshold T represents the lowest acceptable confidence value for which a decision can be made as to whether the phrase matched any of the entries in the NLP database 218. If there is no possible matching entry with a confidence value greater than or equal to T, then the flow proceeds to block 342 where an optional error message is either visually displayed to the user over display 104 or audibly reproduced over speaker 112. In one embodiment, the type of error message, if any, displayed to the user may depend on how many "hits" (i.e., how many matching words from the phrase) were found in the highest-confidence NLP database entry. A different type of error message would be generated if there was zero or one hits, than if there were two or more hits.

If, however, there is at least one entry in the NLP database 218 for which a confidence value greater than or equal to T exists, then the flow proceeds to block 344 where the "noise" words are discarded from the phrase. The "noise" words include words that do not contribute significantly to the overall meaning of the phrase relative to the other words in the phrase. These may include articles, pronouns, conjunctions, and words of a similar nature. "Nonnoise" words would include words that contribute significantly to the overall meaning of the phrase. "Non-noise" words would include verbs, nouns, adjectives, proper names, and words of a similar nature.

Figure 3C:
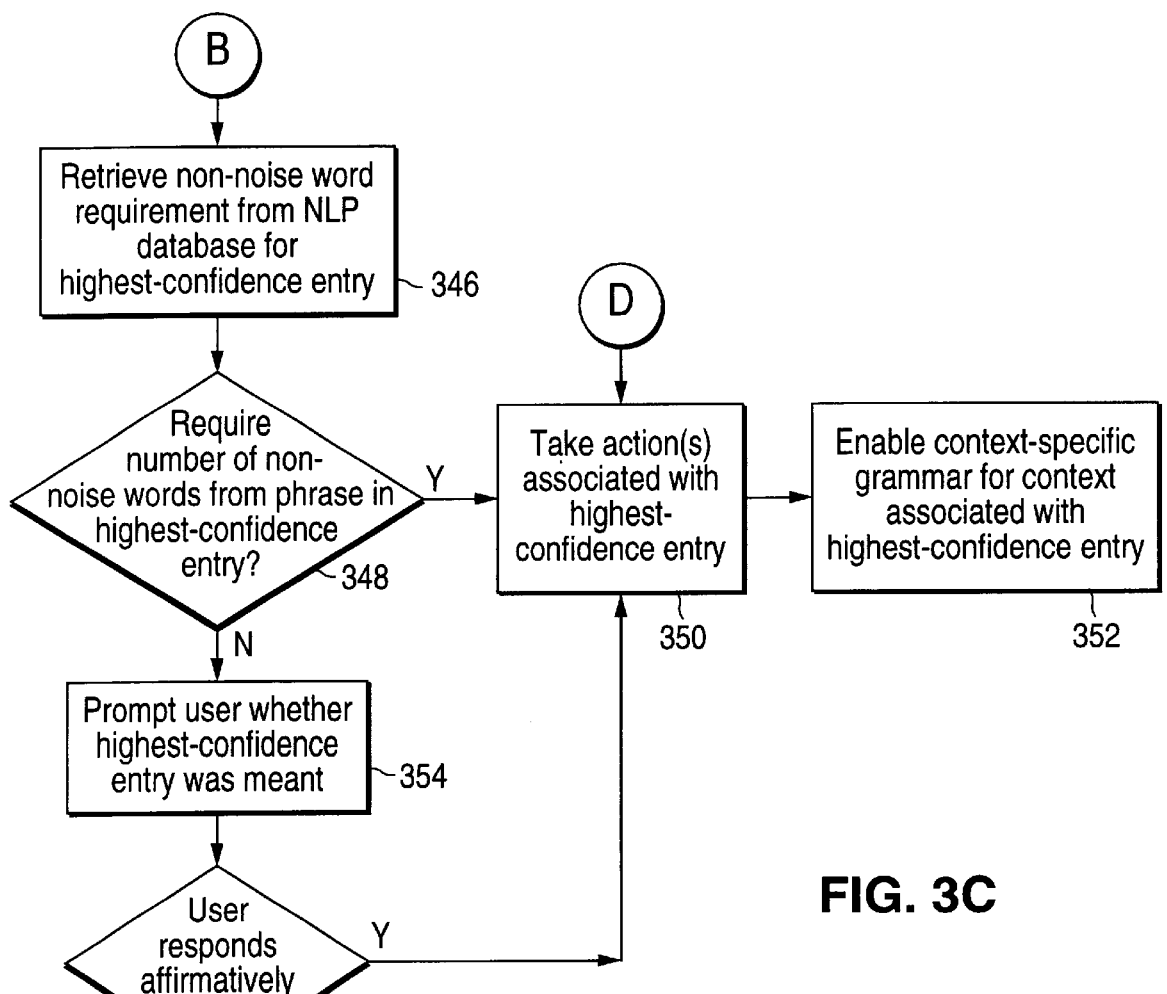

The flow proceeds to FIG. 3C where the non-noise word requirement is retrieved from column 402 of the NLP database 218 for the highest-confidence matching entry at block 346. For example, if the highest-confidence matching phrase was the entry in row 412A, (e.g., "what movies are playing at $time"), then the number of required non-noise words is 3.

At decision 348, a test is made to determine whether the number of required non-noise words from the phrase is actually present in the highest-confidence entry retrieved from the NLP database 218. This test is a verification of the accuracy of the relevance-style search performed at block 336, it being understood that an entry may generate a confidence value higher than the minimum threshold, T, without being an acceptable match for the phrase.

The nature of the test performed at decision 348 is a boolean "AND" test performed by boolean tester 210. The test determines whether each one of the non-noise words in the phrase (or its synonym) is actually present in the highest-confidence entry. If there are a sufficient number of required words actually present in the highest-confidence entry, then the flow proceeds to block 350, where the natural language processor 202 directs application interface 220 to take an associated action from column 408 or 410. It is understood that additional action columns may also be present.

For example, if the highest confidence entry was the entry in row 412A, and the boolean test of decision 348 determined that there actually were 3 non-noise words from the phrase in the entry in column 400, then the associated action in column 408 (e.g., access movie web site) would be taken. Other entries in the NLP database have other associated actions. For example, if the highest-confidence entry is that in row 412E (e.g., "what time is it"), the associated action may be for natural language processor 202 to direct a text-to-speech application (not shown) to speak the present time to the user through the speaker 112. As another example, if the highest-confidence entry is that in row 412F (e.g., "show me the news"), the first associated action may be to access a predetermined news web site on the Internet, and a second associated action may be to direct an image display application (not shown) to display images associated with the news. Different or additional actions may also be performed.

Also, if the highest-confidence entry contains the required number of non-noise words from the phrase as determined at decision 348, the natural language processor 202 instructs the speech recognition processor 200 to enable the context-specific grammar 212 for the associated context of column 404. Thus, for row 412A, context-specific grammar 212 for the context "movies" would be enabled. Thus, when the next utterance is provided to the speech recognition processor 200 in block 300 of FIG. 3A, it would search the enabled context-specific grammar 212 for "movies" before searching the general grammar 214. As previously stated, enabling the appropriate context-specific grammar 212 greatly increases the likelihood of fast, successful speech recognition, and enhances the user's ability to communicate with the computer in a conversational style.

If, however, back at decision 348, the required number of non-noise words from the phrase is not actually present in the highest-confidence entry retrieved from the NLP database 218, then the flow proceeds to block 354 where the user is prompted over display 104 or speaker 112 whether the highest-confidence entry was meant. For example, if the user uttered "How much is IBM stock selling for today," the highest-confidence entry in the NLP database 218 may be the entry in row 412B. In this case, although the relevance factor may be high, the number of required words (or their synonyms) may not be sufficient. Thus, the user would be prompted at block 354 whether he meant "what is the price of IBM stock on Aug. 28, 1998."

The user may respond either affirmatively or negatively. If it is determined at decision 356 that the user has responded affirmatively, then the action(s) associated with the highest-confidence entry are taken at block 350, and the associated context-specific grammar 212 enabled at block 352.

Figure 3D:
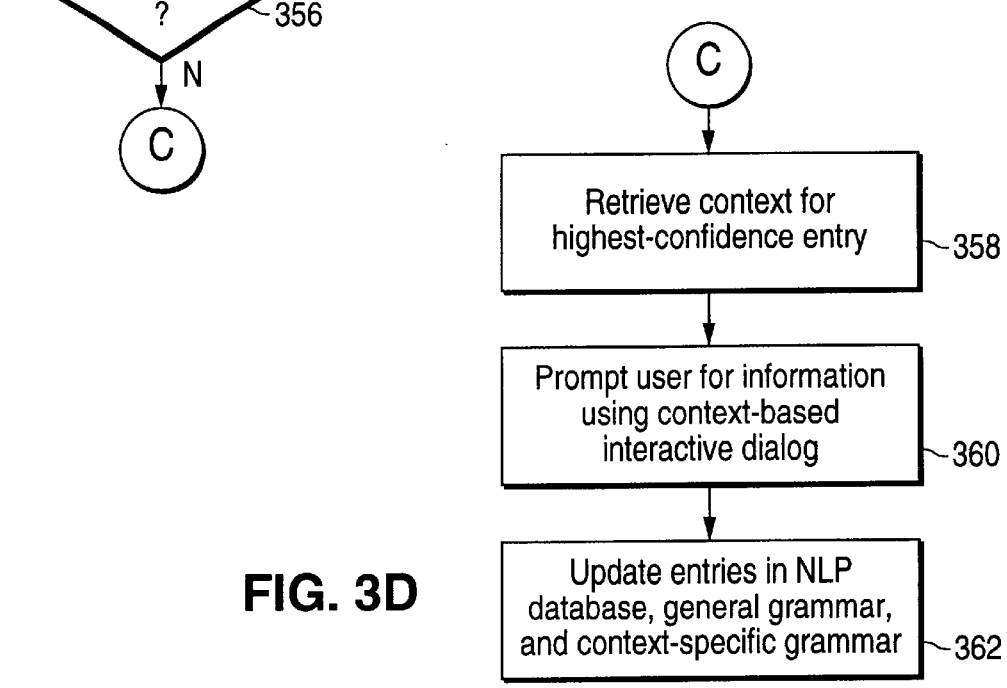

If, however, it is determined at decision 356 that the user has responded negatively, then the flow proceeds to FIG. 3D where the associated context from column 404 of NLP database 218 is retrieved for the highest-confidence entry, and the user is prompted for information using a context-based interactive dialog at block 360. For example, if the user uttered "what is the price of XICOR stock today," and the highest confidence entry from the NLP database 218 was row 412B (e.g., "what is the price of IBM stock on $date"), then the user would be prompted at block 354 whether that was what he meant.

If the user responds negatively, then the context "stock" is retrieved from column 404 at block 358, and the context-based interactive dialog for the stock context is presented to the user over the display 104 and speaker 112. Such a context-based interactive dialog may entail prompting the user for the name and stock ticker symbol of XICOR stock. The user may respond by speaking the required information. A different context-based interactive dialog may be used for each of the possible contexts. For example, the "weather" context-based interactive dialog may entail prompting the user for the name of the location (e.g., the city) about which weather information is desired. Also, the "news" context-based interactive dialog may entail prompting the user for types of articles, news source, Internet URL for the news site, or other related information.

Upon completion of the context-based interactive dialog, the NLP database 218, general grammar 214, and context-specific grammar 212 are updated to include the new information, at block 362. In this way, the next time the user asks for that information, a proper match will be found, and the appropriate action taken without prompting the user for more information. Thus, the present invention adaptively "learns" to recognize phrases uttered by the user.

In one embodiment of the present invention, one or more of the NLP database 218, context specific grammar 212, general grammar 214, and dictation grammar 216 also contain time-stamp values (not shown) associated with each entry. Each time a matching entry is used, the time-stamp value associated with that entry is updated. At periodic intervals, or when initiated by the user, the entries that have a time-stamp value before a certain date and time are removed from their respective databases/grammars. In this way, the databases/grammars may be kept to an efficient size by "purging" old or out-of-date entries. This also assists in avoiding false matches.

Figure 9:
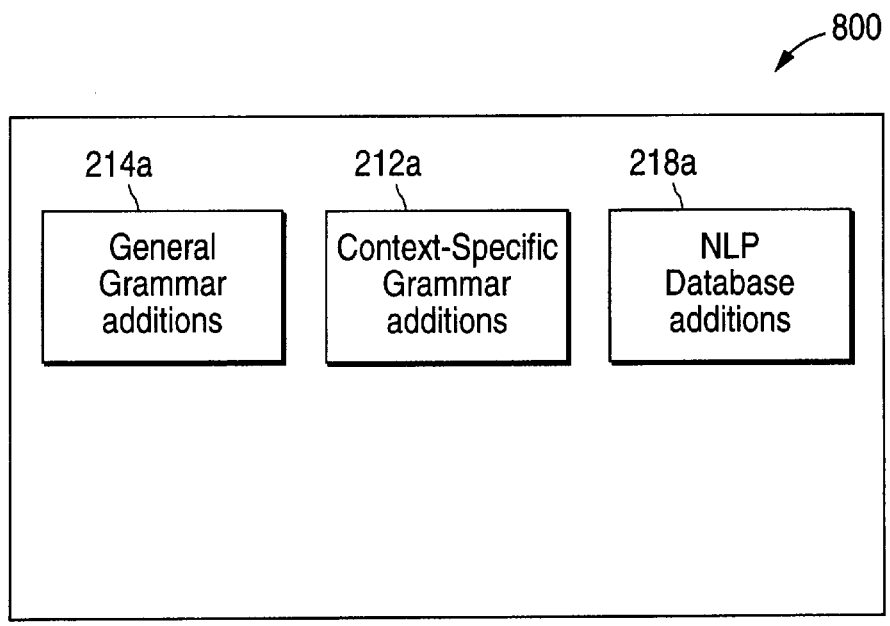
FIG. 9 is a diagram of an exemplary user voice profile according to an embodiment of the present invention.

In an alternate embodiment of hte present invention, the updates to the NLP database 218, general grammar 214, and context-specific grammar 212 are stored in a user voice profile 800, shown in FIG. 9, constructed and operative in accordance with an embodiment of the present invention. A user voice profile 800 would be comprised of any general grammar additions 214*a*, context-specific grammar additions 212*a*, and NLP database additions 218*a* created by the user training. Since each user of the system would have a different user voice profile 800, the embodiment would be flexible enough to allow special customizations and could adapt to the idiosyncrasies of individual users.

Figure 10:
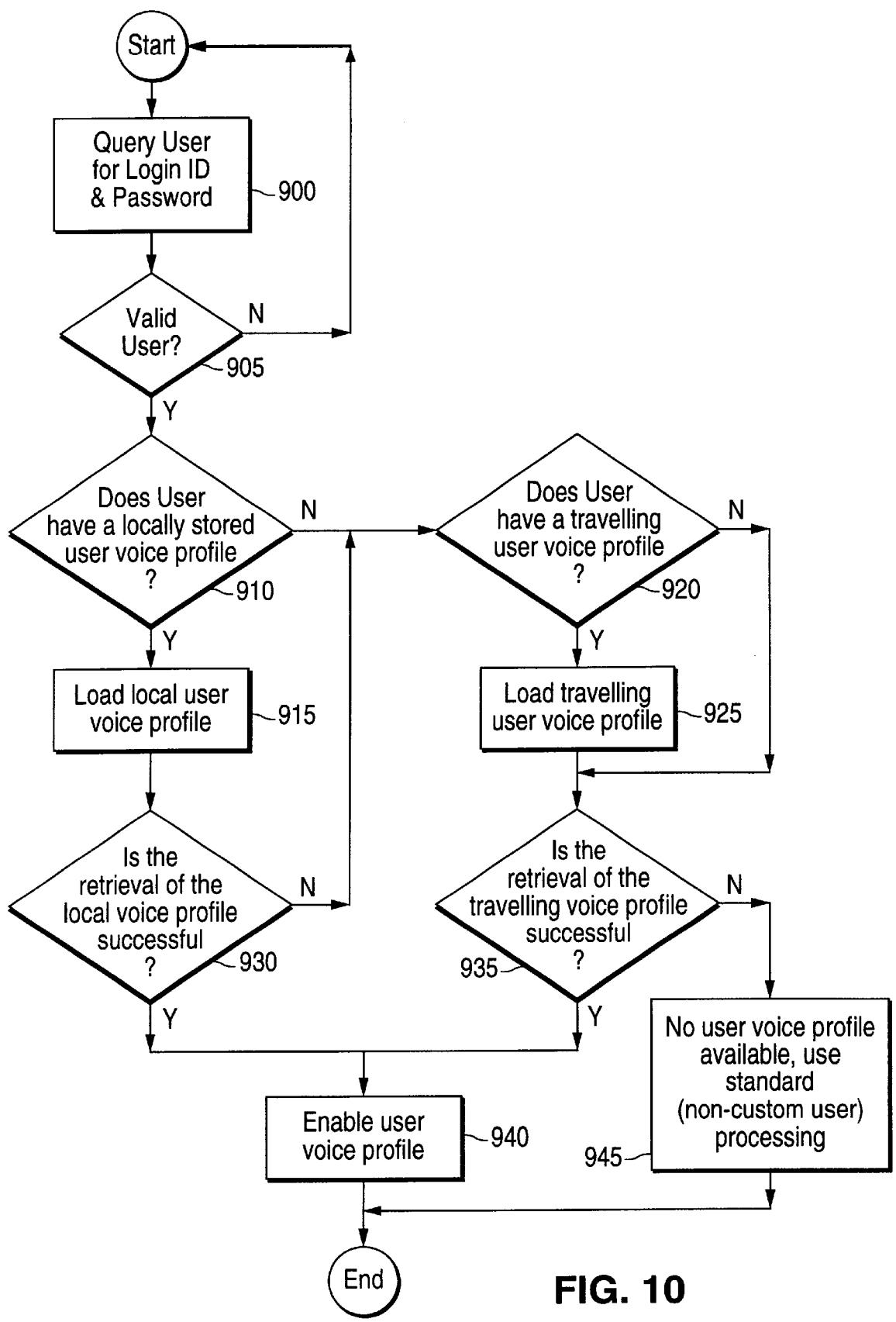
FIG. 10 is a flowchart of a method embodiment of the present invention, illustrating the retrieval and enabling of an individual's user voice profile during login at a computer workstation.

Moreover, in some embodiments of the present invention, the user voice profile 800 would be stored locally and morrored at known server location. The morrored copy, referred to as the "travelling" user voice profile, enables users to access their phrases "adaptively" learned by the embodiment, event when the user is logged into a different location. FIG. 10 illustrates na exemplary method embodiment of the present invention that accesses customized user voice profiles 800 at local and remote (travelling) locations, constructed and operative in accordance with an embodiment of the present invention. Intitially, a valid system user is verified, by any means known in the art, and then the system searches for a locally stored user voice profile. For example, the system queries the user for their login ID and password as shown in block 900. If the password and login ID match, as determined by decision block 905, the user is deemed to be a valid user. It is well understood that this login ID and password are but one of many methods known in the art to verify valid users, and that all such validation systems could be easily substituted. If no local user voice profile is found, block 910, the system searches for a travelling user voice profile, block 920. If either search turns up a user voice profile, the user voice profile is loaded, blocks 915 and 925, respectively. Provided that the retrieval of the user voice profile 800 is successful, blocks 930 and 935, the user voice profile 800 is enabled by extracting the general grammar additions 214*a*, context-specific grammar additions 212*a*, and NLP database additions 218*a*. These "learned" adaptations are then used by the system, as discussed earlier with the method of FIGS. 3A–3D.

In one embodiment of the present invention, speech recognition and natural language processing may be used to interact with objects, such as help files (".hlp" files), World-Wide-Web ("WWW" or "web") pages, or any other objects that have a context-sensitive voice-based interface.

Figure 5:
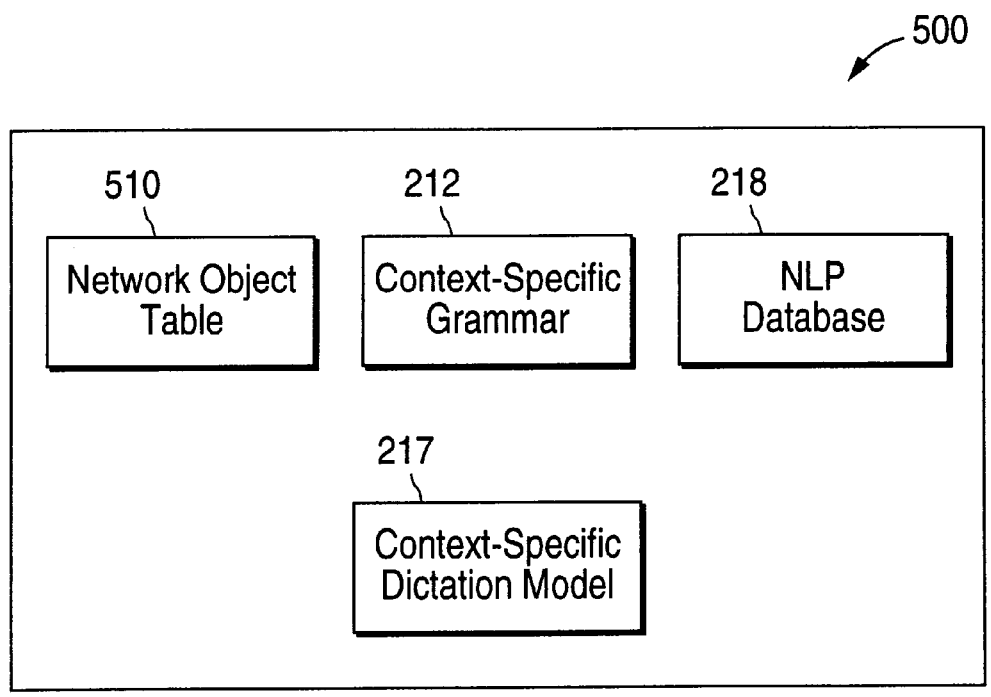
FIG. 5 is a diagram of an exemplary Database Definition File (DDF) according to an embodiment of the present invention.

FIG. 5 illustrates an exemplary Dialog Definition File (DDF) 500, constructed and operative in accordance with an embodiment of the present invention, which represents information necessary to associate the speech recognition and natural language processing to an internet object, such as a text or graphics file or, in one embodiment, a web-page or help file. Although in its simplest embodiment the Dialog Definition File 500 consists of an object table 510, the DDF may also contain additional context-specific grammar files 214 and additional entries for the natural language processing (NLP) database 218, as illustrated in FIG. 5. The embodiment of the DDF 500 includes an object table 510, a context-specific grammar file 214, a context-specific dictation model 217, and a file containing entries to the natural language processing database 218. These components may be compressed and combined into the DDF file 500 by any method known in the art, such as through Lempel-Ziv compression. The context-specific specific grammar file 214 and the natural language processing database 218 are as described in earlier sections. The object table 510 is a memory structure, such as a memory tree, chain or table, which associates an address of a resource with various actions, grammars, or entries in the NLP database 218.

An exemplary embodiment of the object table 510 is illustrated in FIG. 6. FIG. 6 illustrates a memory table which may contain entry columns for: an object 520, a Text-to-Speech (TTS) flag 522, a text speech 524, a use grammar flag 526, an append grammar flag 528, an "is yes/no?" flag, and "do yes" 532 and "do no" 534 actions. Each row in the table 540A–540*n* would represent the grammar and speech related to an individual object. The exemplary embodiment of the invention would refer to objects 520 through a Universal Resource Locator (URL). A URL is a standard method of specifying the address of any resource on the Internet that is part of the World-Wide-Web. As this standard is well known in the art for describing the location of Internet resources and objects, the details of URLs will therefore not be discussed herein. One advantage of URLs is that they can specify information in a large variety of object formats, including hypertext, graphical, database and other files, in addition to a number of object devices and communication protocols. However, as shown in FIG. 6, URLs and other method of specifying objects can be used.

When combined with the text speech 524, the Text-to-Speech (TTS) flag 522 indicates whether an initial statement should be voiced over speaker 112 when the corresponding object is transferred. For example, when transferring the web page listed in the object column 520 of row 540A (http://www.conversit.com), the TTS flag 522 is marked, indicating the text speech 524, "Hello, welcome to . . . ," is to be voiced over speaker 112.

The next three flags relate to the use of grammars associated with this object. The affirmative marking of the "use grammar" 526 or "append grammar" 528 flags indicate the presence of a content-specific grammar file 214 related to the indicated object. The marking of the "use grammar" flag 526 indicates that the new content-specific grammar file 214 replaces the existing content-specific grammar file, and the existing file is disabled. The "append grammar" flag 528 indicates that the new content-specific grammar file should be enabled concurrently with the existing content-specific grammar file.

Lastly, the remaining column entries relate to a "yes/no" grammar structure. If the "Is yes/no?" flag 530 is marked, then a standard "yes/no" grammar is enabled. When a standard "yes/no" grammar is enabled, affirmative commands spoken to the computer result in the computer executing the command indicated in the "Do Yes" entry 532. Similarly, a negative command spoken to the computer results in the computer executing the command indicated in the "Do No" entry 534. The entries in the "Do Yes" 532 and "Do No" 534 columns may either be commands or pointers to commands imbedded in the NLP Database 218. For example, as shown in row 540B, the "Is Yes/No?" flag is marked. An affirmative answer, such as "yes," given to the computer, would result in executing the corresponding command in the "Do Yes" entry 532; in this specific case, the entry is the number "210," a reference to the 210$^{th}$ command in the NLP database. An answer of "no" would result in the computer executing the 211$^{th}$ command in the NLP database.

Figure 7A:
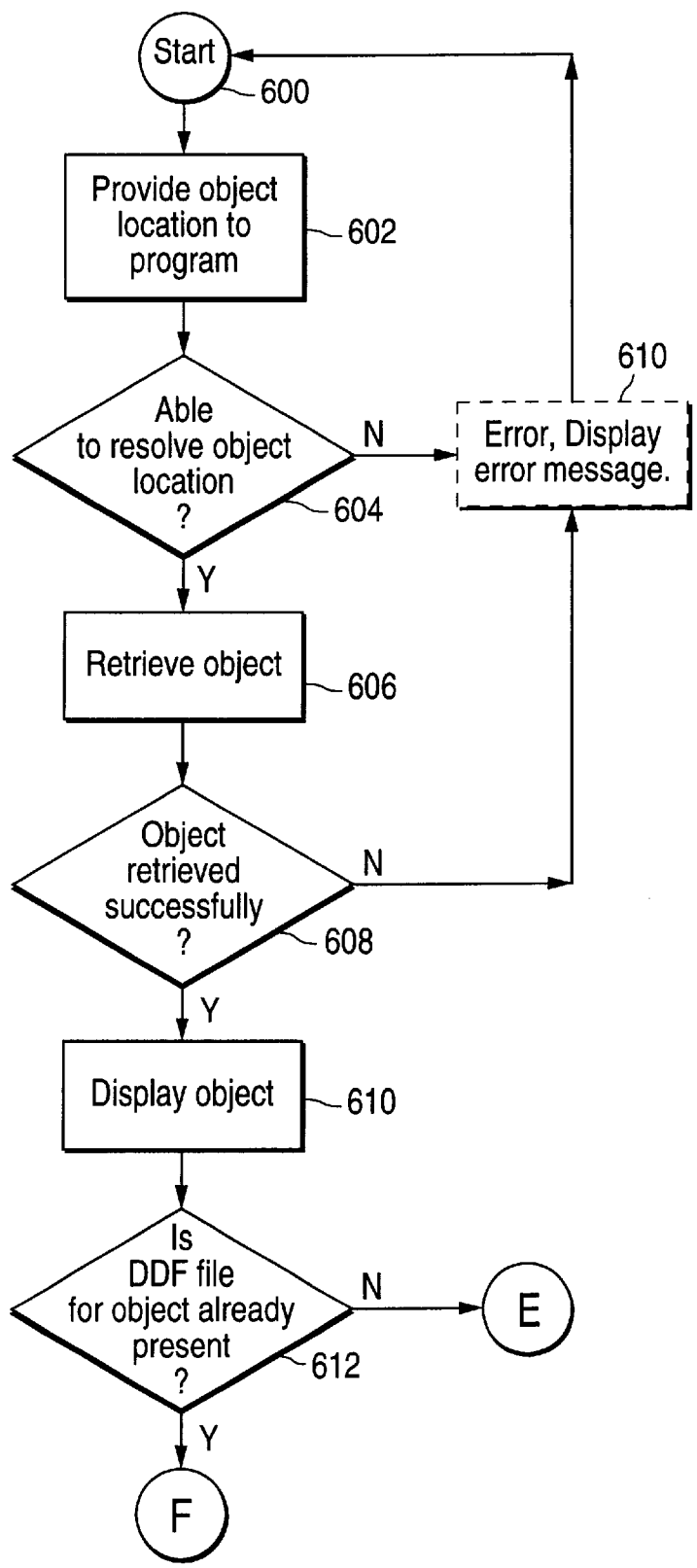
FIGS. 7A–7C are a flowchart of a method embodiment of the present invention, illustrating the linking of interactive speech recognition and natural language processing to a networked object, such as a web-page.

Turning now to FIG. 7A, a method and system of providing speech and voice commands to objects, such as a computer reading a help file or browsing the World-Wide-Web, is illustrated, constructed and operative in accordance with an embodiment of the present invention. The method of FIGS. 7A–7C may be used in conjunction with the method of FIGS. 3A–3D and FIG. 10. In block 602, an object location is provided to a help file reader or World-Wide-Web browser. A help file reader/browser is a program used to examine hypertext documents that are written to help users accomplish tasks or solve problems, and is well known in the art. The web browser is a program used to navigate through the Internet, and is well known in the art. The step, at block 602, of providing an object location to the browser, can be as simple as a user clicking on a program "help" menu item, manually typing in a URL, or having a user select a "link" at a chosen web-site. It also may be the result of a voiced command as described earlier with reference to the action associated with each entry in the NLP database 218. Given the object location, the computer must decide on whether it can resolve object location specified, at block 604. This resolution process is a process well known in the art. If the computer is unable to resolve the object location or internet address, an error message is displayed in the browser window, at block 605, and the system is returned to its initial starting state 600. If the object location or internet address is resolved, the computer retrieves the object at block 606. For a networked object, for example, a web browser sends the web-site a request to for the web page, at block 606. For a help file application, the help reader reads the help file off of storage media 108, at block 606.

A decision is made, depending upon whether the object is retrieved, at block 608. If the object cannot be retrieved, an error message is displayed in the browser window, at block 605, and the system is returned to its initial starting state 600. If the object is retrieved, it is displayed in the help-reader or web-site browser, as appropriate, at block 610.

In decision block 612, the computer 100 determines whether the DDF file 500 corresponding to the object is already present on the computer 100. If the DDF file is present, the flow proceeds to FIG. 7C, if not the flow proceeds to FIG. 7B.

Figure 7B:
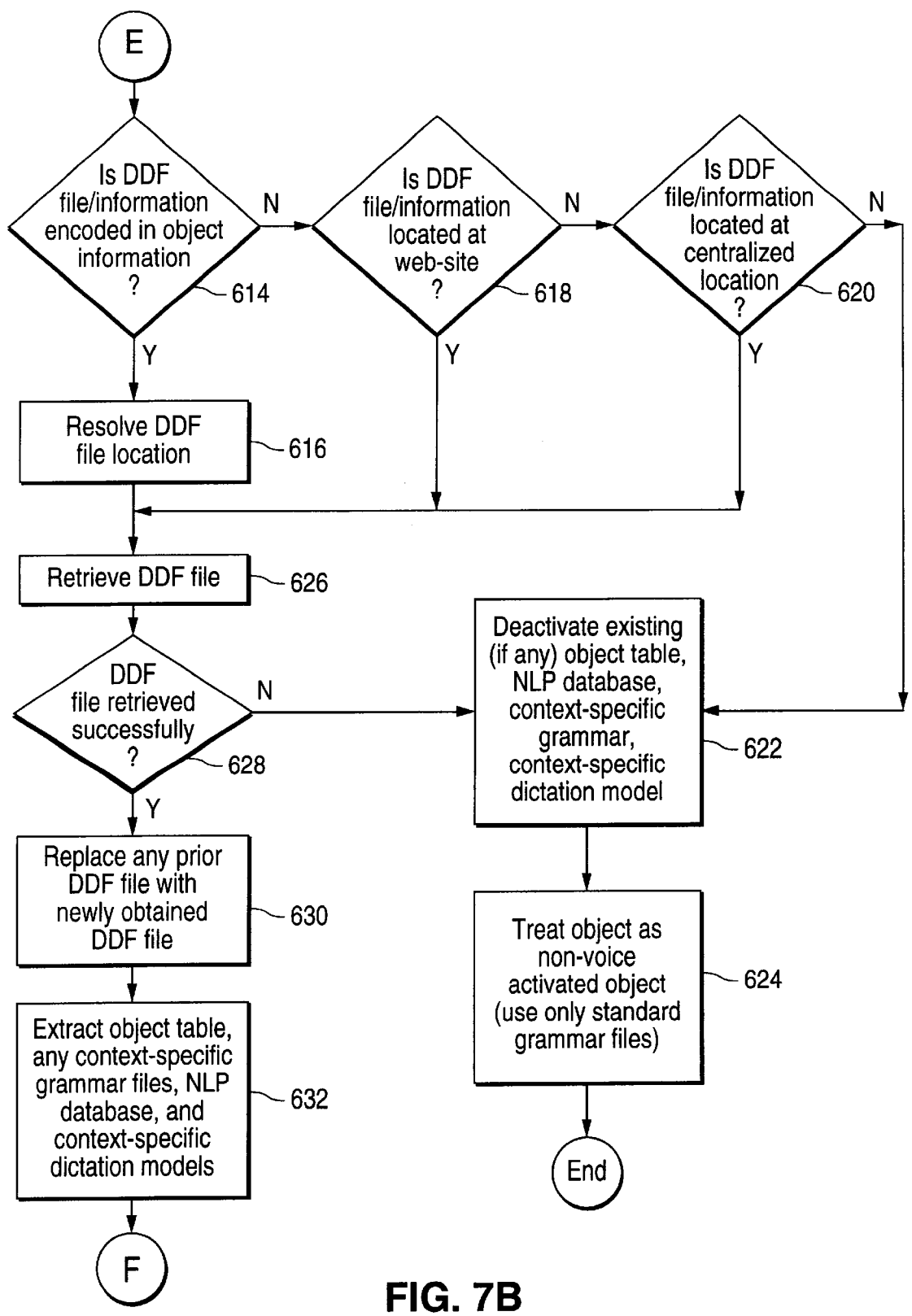

Moving to FIG. 7B, if the DDF file 500 is not present, the computer examines whether the DDF file 500 location is encoded within the object. For example, the DDF file location could be encoded within web page HyperText Markup Language (HTML) as a URL. (Note that HTML is well known in the art, and the details of the language will therefore not be discussed herein.) Encoding DDF file location within HTML code may be done either through listing the DDF file location in an initial HTML meta-tag such as:

<meta DDF="http://www.conversit.com/ConverseIt.ddf"> or directly through a scripting tag written into the variation of HTML supported by the browser, <!- -
 <DDF="http://www.conversit.com/ConverseIt.ddf">
- ->

If the DDF file location information is encoded within the web page, the location's internet address is resolved, at block 616, and the computer requests transfer of the DDF file 500, at block 626. An equivalent encoding scheme could be used within help file hypertext.

Alternatively, if the DDF file 500 location is not encoded within the object, there are several alternate places that it may be stored. It may be stored in a pre-defined location at a web-site, such as a certain file location in the root directory, or at a different centralized location, such as another Internet server or the storage medium 108 of FIG. 1. Blocks 618 and 620 test for these possibilities. Block 618 determines whether the DDF file is located at the web-site. At this step, the computer sends query to the web-site inquiring about the presence of the DDF file 500. If the DDF file 500 is present at the web-site, the computer requests transfer of the DDF file 500, at block 626. If the DDF file 500 is not located at the web-site, the computer queries the centralized location about the presence of a DDF file for the web-site, at block 620. If the DDF file is present at the web-site, the computer requests transfer of the DDF file, at block 626. If the DDF file 500 cannot be found, the existing components of any present DDF file, such as the object table 510, context-specific dictation model 217, NLP database 218 associated with the object, and context-specific grammar 214 for any previously-viewed object, are deactivated in block 622. Furthermore, the object is treated as a non-voice-activated object, and only standard grammar files are used, at block 624. Standard grammar files are the grammar files existing on the system excluding any grammars associated with the content-specific grammar file associated with the object.

If the DDF file 500 is requested at block 626, and its transfer is unsuccessful, any existing components of any present DDF file 500 are deactivated, at block 622, and the website is treated as a non-voice-activated object, and only standard grammar files are used, at block 624.

If the DDF file 500 is requested at block 626 and its transfer is successful at block 628, it replaces any prior DDF file, at block 630. Any components of the DDF file 500, such as the object table 510, context-specific-grammar files 214, context-specific-dictation models 217, and NLP database 218 are extracted at block 632. A similar technique may be used for obtaining the software necessary to implement the method illustrated in FIGS. 3A–3D, comprising the functional elements of FIG. 2.

Figure 7C:
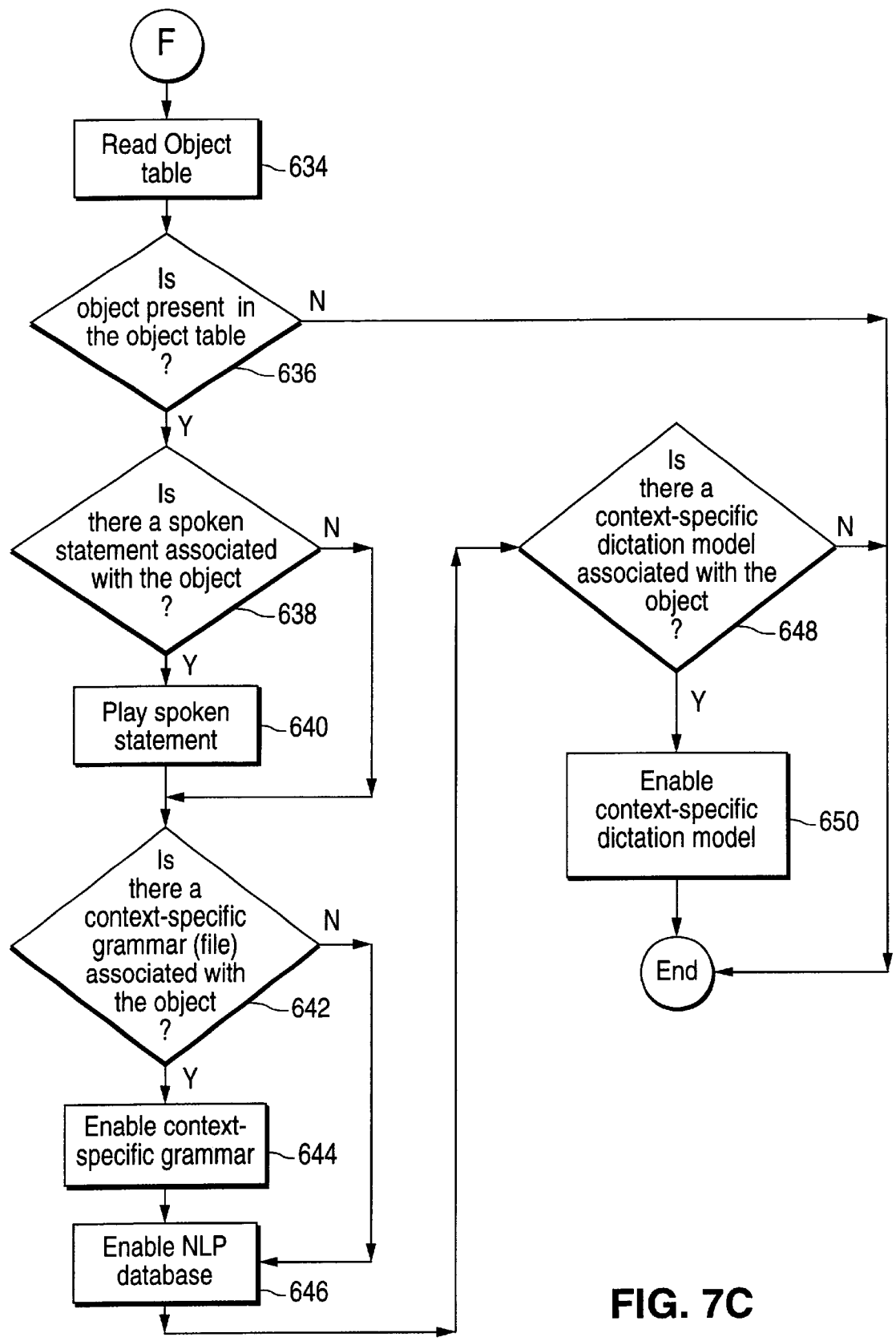

The flow moves to FIG. 7C. The object table 510 is read into memory by the computer in block 634. If the object is present in the site object table 510, as determined by block 636, it will be represented by a row 540A–540n of the table, as shown in FIG. 6. Each row of the object table represents the speech-interactions available to a user for that particular object. If no row corresponding to the object exists, then no-speech interaction exists for the web page, and processing ends.

If the object location is present in the site object table 510, as determined by block 636, the computer checks if the TTS flag 522 is marked, to determine whether a text speech 524 is associated with the web-page, at block 638. If there is a text speech 524, it is voiced at block 640, and flow continues. If there is a context-specific grammar file associated with object, as determined by decision block 642, it is enabled at block 644, and then the NLP database 218 is enabled at block 646. If no context-specific grammar file is associated with the object, only the NLP database 218 is enabled at block 646. Once the NLP database is enabled 646, the system behaves as FIGS. 3A–3C, as described above.

In summary, the embodiments of the present invention provide a method and system for an interactive user-interface for a computer. By the use of context-specific grammars, the embodiments decrease speech recognition time and increase the user's ability to communicate with the computer in a conversational style. Through adaptive updating of the various grammars and the NLP database, the embodiments further increase interactive efficiency. The adaptive updates can be incorporated into user voice profiles that can be stored locally and remotely, to allow users to access the voice profiles at various locations.

The previous description of the embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

I claim:

1. A method of interacting with an object via a computer using utterances, the method comprising:
    searching a context-specific grammar file for a matching phrase for the utterance;
    searching a general grammar file for the matching phrase if the matching phrase is not found in the context-specific grammar file;
    searching a dictation grammar for the matching phrase if the matching phrase is not found in the general file;
    searching a context-specific dictation model for the matching phrase if the matching phrase is not found in the dictation grammar file,
    searching a database for a matching entry for the matching phrase with a natural language processor; and
    performing an action associated with the matching entry if the match entry is found in the database.

2. The method of claim 1 further comprising:
    replacing at least one word in the matching phrase prior to searching the database.

3. The method of claim 2 wherein the replacing of the at least one word comprises substituting a wildcard for the at least one word.

4. The method of claim 3 wherein the replacing of the at least one word comprises substituting a proper name for the at least one word.

5. The method of claim 4 further comprising:
    text formatting the matching phrase prior to searching the database.

6. The method of claim 4 further comprising:
    weighting individual words in the matching phrase according to a relative significance of the individual words prior to searching the database.

7. The method of claim 1 further comprising:
    updating a user voice profile with at least one of the database, the context-specific grammer file and the general grammar file with the matching phrase if the matching entry is not found in the database.

8. The method of claim 7 further comprising:
    storing the user voice profile locally.

9. The method of claim 7 further comprising:
    storing the user voice profile at a remote location over a network.

10. The method of claim 7 further comprising:
    storing the user voice profile locally and at a remote location over a network.

11. The method of claim 1 further comprising:
    generating a confidence value for the matching entry.

12. The method of claim 11 further comprising:
    comparing the confidence value and a threshold value.

13. The method of 12 further comprising:
    determining whether a required number of words from the matching phrase are present in the matching entry.

14. The method of claim 13 further comprising:
    prompting a user whether the matching entry is a correct interpretation of the utterance if the required number of words from the matching phrase are not present in the matching entry.

15. The method of claim 14 further comprising:
    prompting a user for additional information if the matching entry is not a correct interpretation of the utterance.

16. The method of claim 15 further comprising:
    updating at least one of the database, the context-specific grammar file and the general grammer file with the additional information.

17. The method of claim 16 further comprising:
    storing the user voice profile locally.

18. The method of claim 16 further comprising:
    storing the user voice profile at a remote location over a network.

19. The method of claim 16 further comprising;
    storing the user voice profile locally and at a remote location over a network.

20. The method of claim 1 wherein the object is a web page.

21. The method of claim 1 wherein the object is a help file.

22. A system of interacting with a computer using utterances, the system comprising:
    a speech processor configured to search a context-specific grammar file for a matching phrase for the utterance, to search a general grammar file for the matching phrase if the matching phrase is not found in the context-specific grammer file, to search a dictation grammar for the matching phrase if the matching phrase is not found in the general grammar file, and to search a context-specific dictation model if the matching phrase is not found in the dictation grammar;
    a natural language processor configured to search a database for a matching entry for the matching phase; and
    an application interface configured to perform an action associated with the matching entry if the matching entry is found in the database.

23. The system of claim 22 wherein the natural language processor is further configured to update a user voice profile with at least one of the database, the context-specific grammar file and the general grammar file with the matching phrase if the matching entry is not found in the database.

24. The system of claim 23 wherein the user voice profile is stored locally.

25. The system of claim 23 wherein the user voice profile is stored remotely over a network.

26. The system of claim 23 wherein the user voice profile is stored locally and remotely over a network.

27. The system of claim 23 wherein the speech processor is further configured to search to context-specific grammar associated with the matching entry for a subsequent utterance.

28. The system of claim 22 further wherein the natural language processor is further configured to replace at least one word in the matching phrase prior to searching the database.

29. The system of claim 28 further comprising:
a variable replacer in the natural language processor configured to substitute a wildcard for the at least one word in the matching phrase.

30. The system of claim 28 further comprising:
a pronoun substituter in the natural language processor configure to substitute a proper name for at least one word in the matching phrase.

31. The system of claim 22 further comprising:
a string formatter configured to text format the matching phrase prior to searching the database.

32. The system of claim 22 further comprising:
a word weighter configured to weigh individual words in the matching phrase according to a relative significance of the individual words prior to searching the database.

33. The system of claim 22 further comprising:
a search engine in the natural language processor configured to generate a confidence value for the matching entry.

34. The system of claim 33 wherein the natural language processor is further configured to compare the confidence value with a threshold value.

35. The system of claim 34 further comprising:
a boolean tester configured to determine whether a required number of words from the matching phrase are present in the matching entry.

36. The system of claim 35 wherein the natural language processor is further configured to prompt a user whether the matching entry is a correct interpretation of the utterance if the required number of words from the matching phrase are not present in the matching entry.

37. The system of claim 35 wherein the natural language processor is further configured to prompt a user for additional information if the matching entry is not a correct interpretation of the utterance.

38. The system of claim 37 wherein the natural language processor is further configured to update at least one of the database, the context-specific grammar file and the general grammar file with the additional information.

39. A computer readable medium encoded with data and instructions, when read by a computer will cause the computer to:
search a context-specific grammar file for a matching phrase for an utterance;
search a general grammar file for the matching phrase if the matching phrase is not found in the context-specific grammar file;
search a dictation grammar for the matching phrase if the matching phrase is not found in the general grammar file;
search a context-specific dictation model for the matching phrase if the matching phrase is not found in the dictation grammar file;
search a database for a matching entry for the matching phrase with a natural language processor; and
perform an action associated with the matching entry if the matching entry is found in the database.

40. The computer readable medium of claim 39 wherein the instructions further causes a computer to:
replace at least one word in the matching phrase prior to searching the database.

41. The computer readable medium of claim 40 wherein the replacing of the at least one word comprises substituting a wildcard for the at least one word.

42. The computer readable medium of claim 41 wherein the replacing of the at least one word comprises substituting a proper name for the at least one word.

43. The computer readable medium of clam 42 wherein the instructions further causes a computer to:
text format the matching phrase prior to searching the database.

44. The computer readable medium of claim 42 wherein the instructions further causes a computer to:
weigh individual words in the matching phrase according to a relative significance of the individual words prior to searching the database.

45. The computer readable medium of claim 39 wherein the instructions further causes a computer to:
update a user voice profile with at least one of the database, the context-specific grammar file and the general grammar file with the marching phrase if the matching entry is not found in the database.

46. The computer readable medium of claim 45 wherein the instructions further causes a computer to:
store the user voice profile locally.

47. The computer readable medium of claim 45 wherein the instructions further causes a computer to:
store the user voice profile remote location over a network.

48. The computer readable medium of claim 45 wherein the instructions further causes a computer to:
store the user voice profile locally and at a remote location over a network.

49. The computer readable medium of claim 39 wherein the instructions further causes a computer to:
generate a confidence values for the matching entry.

50. The computer readable medium of claim 49 wherein the instructions further causes a computer to:
compare the confidence value with a threshold value.

51. The computer readable medium of claim 50 wherein the instructions further causes a computer to:
determine whether a required number of words from the matching phrase are present in the matching entry.

52. The computer readable medium of claim 51 wherein the instructions further causes a computer to:
prompt a user whether the matching entry is a correct interpretation of the utterance if the required number of words from the matching phrase are not present in the matching entry.

53. The computer readable medium of claim 52 wherein the instructions further causes a computer to:
prompt a user for additional information if the matching entry is not a correct interpretation of the utterance.

54. The computer readable medium of claim 53 wherein the instructions further causes a computer to:
update at least one of the database, the context-specific grammar file and the general grammar file with the additional information.

55. The computer readable medium of claim 54 wherein the instructions further causes a computer to:
store the user voice profile locally.

56. The computer readable medium of claim 54 wherein the instructions further causes a computer to:
store the user voice profile remote location over a network.

57. The computer readable medium of claim 54 wherein the instructions further causes a computer to:
store the user voice profile locally and at a remote location over a network.

58. An apparatus comprising:
means for searching a context-specific grammar file for a matching phrase for an utterance;

means for searching a general grammar file for the matching phrase if the marching phrase is not found in the context-specific grammar file;

means for searching a dictation grammar for the mating phrase if the matching phrase is not found in the general grammar file;

means for searching a context-specific dictation model for the matching phrase if the matching phrase is not found in the dictation grammar file, means for searching a database for a matching entry for the matching phrase with a natural language processor; and means for performing an action associated with the matching a entry if the matching entry is found in the database.

59. The apparatus of claim 58 further comprising:

means for replacing at least one word in the matching phrase prior to searching the database.

60. The apparatus of claim 59 wherein the means for replacing of the at least one word is configured to substitute a wildcard for the at least one word.

61. The apparatus of claim 60 wherein the means for replacing of the at least one word is configured to substituting a proper name for the at least one word.

62. The apparatus of claim 61 further comprising:

means for text formatting the matching phrase prior to searching the database.

63. The apparatus of claim 61 further comprising:

means for weighting individual words in the matching phrase according to a relative significance of the individual words prior to searching the database.

64. The apparatus of claim 58 further comprising:

means for updating a user voice profile with at least one of the database, the context-specific grammar file and the general grammar file with the matching phrase if the matching entry is not found in the database.

65. The apparatus of claim 64 further comprising:

means for storing the user voice profile locally.

66. The apparatus of claim 64 further comprising:

means for storing the user voice profile remote location over a network.

67. The apparatus of claim 64 further comprising:

means for storing the user voice profile locally and at a remote location over a network.

68. The apparatus of claim 58 further comprising:

means for generating a confidence values for the matching entry.

69. The apparatus of claim 68 further comprising:

means for comparing the confidence value with a threshold value.

70. The apparatus of claim 69 further comprising:

means for determining whether a required number of words from the matching phrase are present in the matching entry.

71. The apparatus of claim 70 for comprising:

means for prompting a user whether the matching entry is a correct interpretation of the utterance if the required number of words from the matching phrase are not present in the matching entry.

72. The apparatus of claim 71 further comprising:

means for prompting a user for additional information if the matching entry is not a correct interpretation of the utterance.

73. The apparatus of claim 72 further comprising:

means for updating at least one of the database, the context-specific grammar file and the general grammar file with the additional information.

74. The apparatus of claim 73 further comprising:

means for storing the user voice profile locally.

75. The apparatus of claim 73 further comprising:

means for storing the user voice profile remote location over a network.

76. The apparatus of claim 73 further comprising:

means foe storing the user voice profile locally and at a remote location over a network.

* * * * *